Sept. 22, 1936.   R. S. SANFORD   2,055,241
BRAKE
Filed Feb. 8, 1932   2 Sheets-Sheet 1
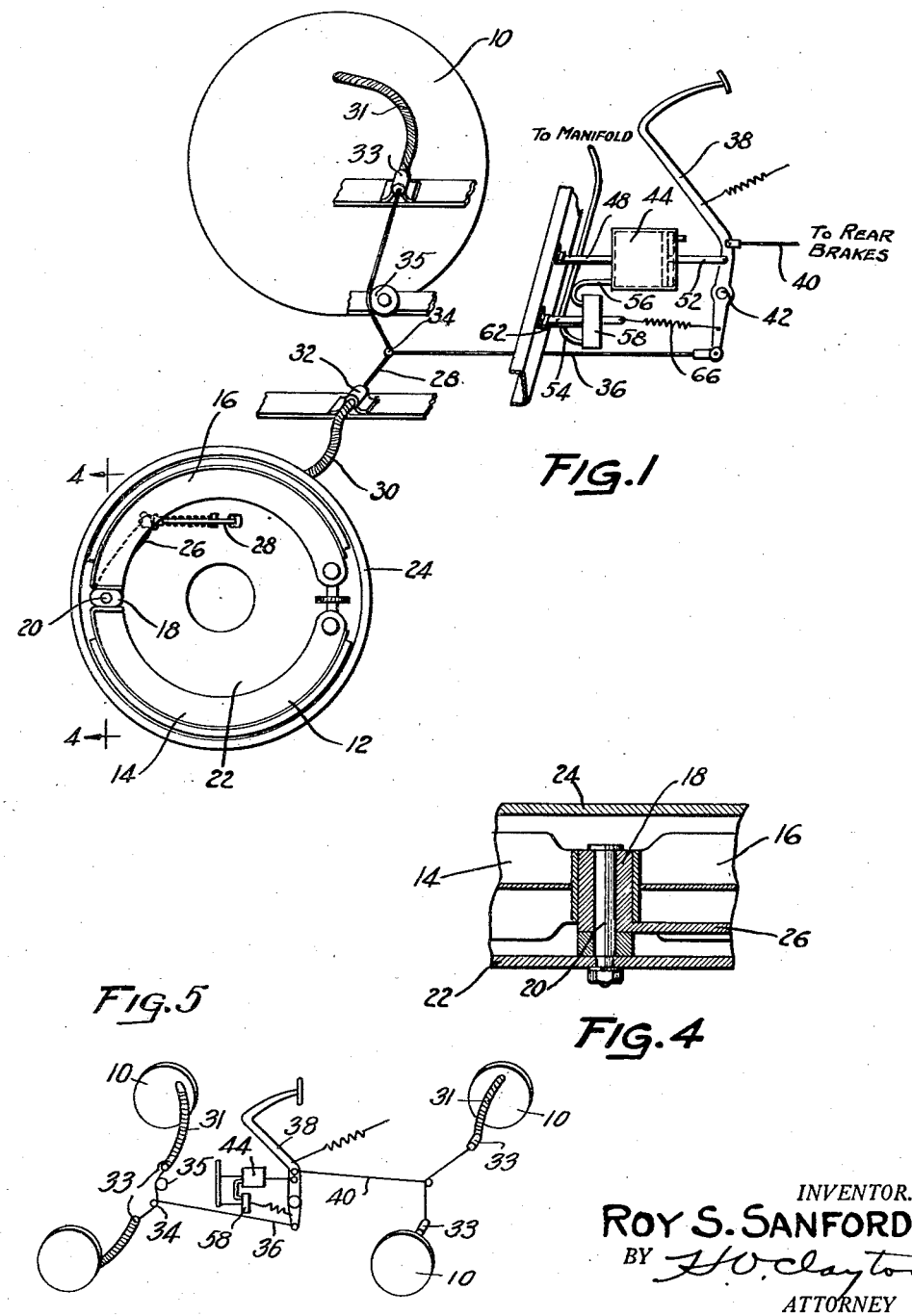
INVENTOR.
ROY S. SANFORD
BY H. V. Clayton
ATTORNEY Sept. 22, 1936.  R. S. SANFORD  2,055,241
BRAKE
Filed Feb. 8, 1932  2 Sheets-Sheet 2

INVENTOR.
Roy S. Sanford
BY *H. O. Clayton*
ATTORNEY

Patented Sept. 22, 1936

2,055,241

UNITED STATES PATENT OFFICE 2,055,241

BRAKE

Roy S. Sanford, South Bend, Ind., assignor to Bendix Aviation Corporation, South Bend, Ind., a corporation of Delaware Application February 8, 1932, Serial No. 591,722

3 Claims. (Cl. 188—152)

This invention relates to a brake mechanism for automotive vehicles, and particularly to power operated means for supplementing a brake operating structure of the torque equalizing type.

With such an equalizing structure, mechanism is provided that operates when the friction is equal in the different brakes to thrust the brake friction elements against the brake drum with the same degree of pressure and that also operates when the friction tends to be unequal to effect as much greater pressure on the friction elements exacting the lesser friction and as much less pressure on the friction elements exerting the greater friction as will substantially equalize the friction in the different brakes, so that the braking action of the tires upon the road will be as nearly alike as possible.

It is apparent that in order to obtain adequate braking that a substantial amount of pressure upon the pedal must necessarily be exerted when the coefficient of friction of one of the brakes is materially lowered; for example, when the lining becomes wet or oily.

It is, therefore, the principal object of the invention to provide a booster or power mechanism adapted for use with a torque equalized braking system to thereby supplement the manual effort of applying the brakes.

Other objects of the invention and desirable details of construction and combinations of parts will become apparent from the following description of a preferred embodiment taken in conjunction with the accompanying drawings, in which:

Figure 1 is a diagrammatic view of the braking mechanism constituting the present invention;

Figure 4 is a sectional view taken on line 4—4 of Figure 1 disclosing the cam operating structure of one of the wheel brakes; and Figure 5 is a diagrammatic view on a small scale illustrating in addition the connection to the rear brakes.

Figure 3:
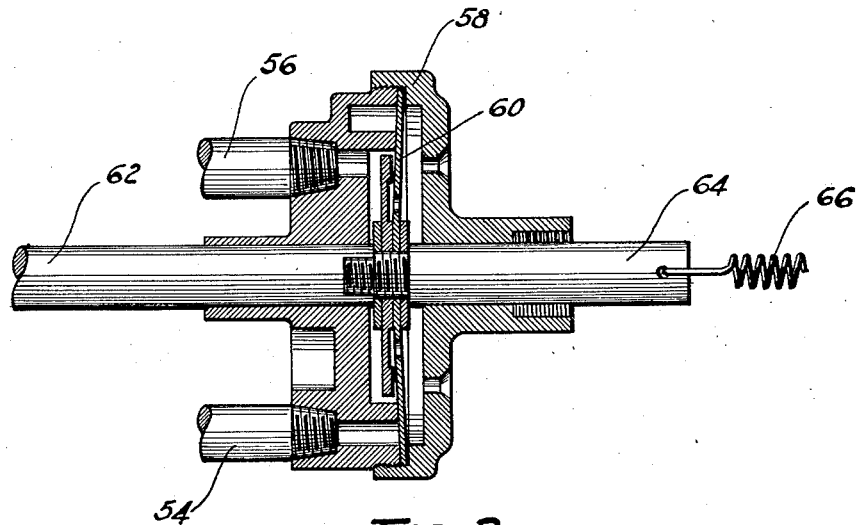
Figure 3 is a sectional view of the control valve for the booster motor.
Figure 2:
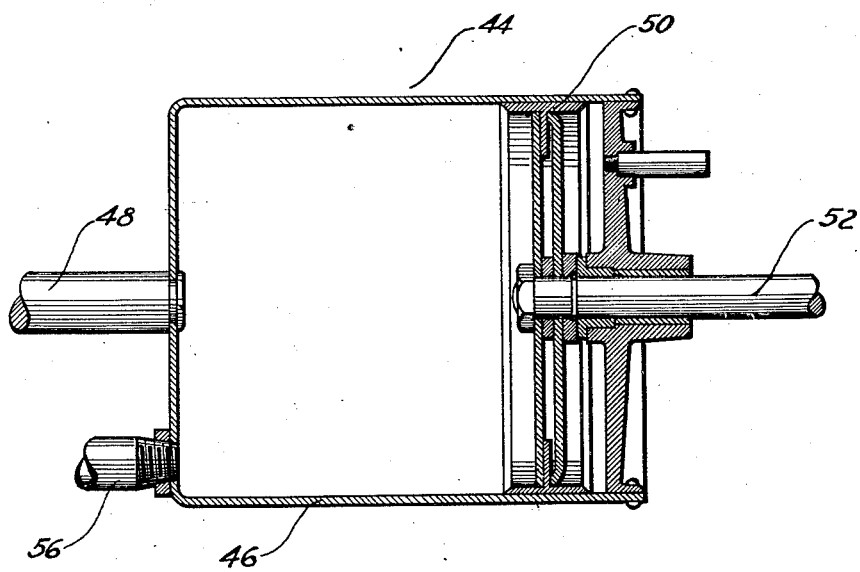
Figure 2 is a sectional view of the booster motor.

In that embodiment of the invention selected for illustration there are provided front wheel brakes 10 and 12 of the internal expanding type. Each brake preferably comprises a pair of adjustably connected floating friction lined shoes 14 and 16, one or the other of which, depending upon the direction of wheel rotation, is adapted to anchor on a cam member 18 rotatably mounted on a fixed anchor 20 secured to a support plate 22. Each of the brake structures includes the usual rotatable brake drum 24 to be contacted by the brake shoes. The cam 18 is provided with an integrally connected actuating arm 26 operably connected at its end to a flexible cable member 28 housed within a flexible sheath or conduit 30 secured at one of its ends to the support plate 22. The conduit at its remaining end may be secured by a fitting 32 to the chassis of the vehicle.

The cables of each brake are connected at 34 with a common actuating cable 36, the latter being pivotally connected to the end of the lower arm of a foot pedal lever 38 accessible to the driver. One of the cables 28 also passes over fixed pulley 35 in order to keep the connection 34 normally substantially one-half way between the guided portions of the cables 28. The rear brakes of the vehicle are preferably applied by rod 40, pivotally connected to the pedal above its pivotal mounting or fulcrum 42.

Describing the operation of the aforementioned brake structure, actuation of the pedal 38 serves to rotate the cams 18 to spread the shoes apart and apply the brakes. It will be seen that if the degree of friction between the brake shoes and brake drum is greater in one of the brakes than in the remaining brake that the tendency to rotation of the brake shoes in the brake having greater friction will be greater than that of the brake shoes in the brake having the lesser friction and, consequently, that brake having the greater friction will retract its associated cam actuating arm 26 sufficiently to exert a pull on the adjacent end of its cable 28 in a direction opposite to and counteracting the pull on the cam lever of the remaining brake produced by pressure of the operator's foot upon the brake pedal. Thus as much greater pressure will be effected on the brake shoes exerting the lesser friction and as much less pressure will be effected on the shoes exerting the greater friction as will substantially equalize the friction between the different drums and their associated brake shoes.

This means that the torque or braking effect of one of the front brakes is equal to that of the remaining front brake, and it follows that a substantial amount of foot pressure must be applied to the pedal lever to obtain effective braking of the front brakes when at least one of said brakes is inefficient.

In order to compensate for this additional burden upon the driver, power means are provided to supplement his effort.

To this end there is provided a fluid motor 44 comprising a casing 46, pivotally secured to the chassis by link 48, and a reciprocable piston 50, pivotally secured by a rod 52, to the pedal 38. The rod 52 is preferably connected to the pedal below the connection with the rear brakes. The cylinder 46 is adapted to be evacuated of its air, or a substantial portion thereof, to thereby impose an atmospheric load upon the piston 50 to apply the brakes and thereby augment the physical effort of the driver, all as previously described. To this end the cylinder 46 is connected with the intake manifold of the internal combustion engine, not shown, via conduits 54 and 56, a control valve for the motor being interposed in the conduit circuit. The valve, which forms no part of the instant invention, briefly comprises two relatively movable casing and diaphragm parts 58 and 60 connected respectively, to the chassis and to the pedal, by links 62 and 64. A spring 66 is interposed in the connection between the diaphragm and pedal to obviate injury to the valve parts when the power mechanism is inoperative.

Operation of the valve by the pedal 38 serves to place the manifold in circuit with the cylinder 46 to thereby evacuate the latter and apply the brakes by power. As is well-known in the art, the manifold at closed throttle is evacuated to a subatmospheric pressure of approximately ten pounds per square inch. Describing the operation of the brake mechanism in greater detail, counterclockwise movement of the pedal serves to simultaneously manually apply the front and rear brakes and operate the valve to apply the brakes by power. It will also be noted that the front and rear brakes are applied by physical effort, or at least the application of said brakes is initiated, prior to the power operation of the brakes; for with the structure disclosed the brakes will be operated with the initial movement of the pedal 38. It will further be noted that with the particular arrangement of the parts that the power device is incapable of applying the brakes alone and that with release of the pressure upon the pedal the valve is actuated to denergize the fluid motor and release the brakes. The spring 66 also insures a follow-up action of the valve, permitting the same to be self-lapping to hold the brakes as applied.

There is thus provided a very effective brake mechanism insuring equal braking efficiency of the front wheel brakes and also insuring adequate pedal pressure to render said brakes effective. In Figure 5 there is shown diagrammatically the complete arrangement of a hookup in which the rear brakes are also operated by the same type of structure, thus providing a power operated four wheel brake system in which the torque of the two front wheels is equalized and the torque of the two rear wheels is also equalized.

While one illustrative embodiment has been described, it is not my intention to limit the scope of the invention to that particular embodiment, or otherwise than by the terms of the appended claims.

I claim:

1. An automotive brake structure comprising, in combination, wheel brakes, means including a manually operable member for so operating the wheel brakes as to obtain an equal braking effect from each of said brakes, and power means including relatively movable cylinder and piston members, said piston member being directly connected to said manually operable member, said power means further including a valve member also directly connected to said manually operable member, said power means supplementing the operation of the aforementioned manually operable member.

2. An automotive brake structure comprising in combination wheel brakes, means including a manually operable member for so operating the wheel brakes as to obtain an equal braking effect from each of said brakes, and power operating means connected to and adapted to assist the effort applied to the first mentioned means.

3. An automotive brake structure for a vehicle having a frame comprising in combination wheel brakes, means including a manually operable member for operating the wheel brakes so as to obtain equal braking effect from each of said brakes and comprising a pivoted foot pedal, a tension connection from said pedal to said brakes, an applying member for each of said brakes which are operated by said connection and on which the torque from the braking reacts, and equalizing means interposed in said connection, power means including a cylinder secured to said frame and a movable piston in said cylinder, said piston being connected to the pedal directly and non-resiliently, said power means also including a valve member for controlling the cylinder and piston having one portion secured to the frame and having another portion resiliently connected to the pedal, said power means supplementing the operation of the aforementioned manually operable means.

ROY S. SANFORD.